(No Model.)

J. MELTSNER.
WATER COOLER.

No. 575,898. Patented Jan. 26, 1897.

WITNESSES
John Buckler,
C. Gerst

INVENTOR
Joseph Meltsner
BY
Edgar Tate & Co
ATTORNEYS.

UNITED STATES PATENT OFFICE.

JOSEPH MELTSNER, OF NEW YORK, N. Y.

WATER-COOLER.

SPECIFICATION forming part of Letters Patent No. 575,898, dated January 26, 1897.

Application filed June 11, 1896. Serial No. 595,125. (No model.)

*To all whom it may concern:*

Be it known that I, JOSEPH MELTSNER, a subject of the Czar of Russia, and a resident of New York, in the county of New York and State of New York, have invented certain new and useful Improvements in Water-Coolers, of which the following is a specification, reference being had to the accompanying drawings, forming a part thereof, in which similar numerals of reference indicate corresponding parts wherever found throughout the several views.

This invention relates to water-coolers; and the object thereof is to provide an improved device of this class in which the water to be cooled is not brought directly in contact with the ice; and with this and other objects in view the invention consists in the construction, combination, and arrangement of parts hereinafter described and claimed.

The invention is fully disclosed in the following specification, of which the accompanying drawings form a part, in which—

Figure 1:
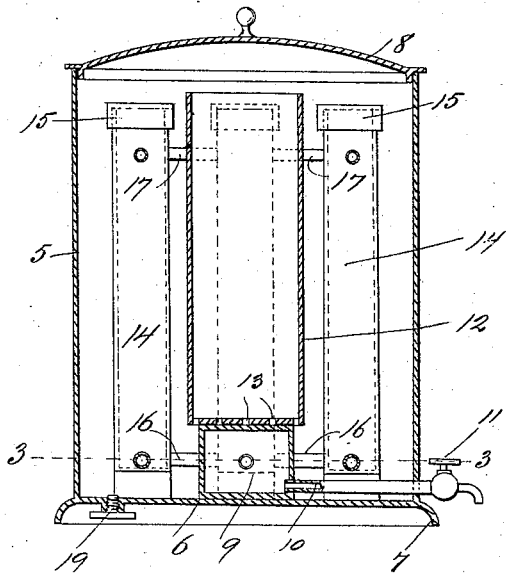
Figure 2:
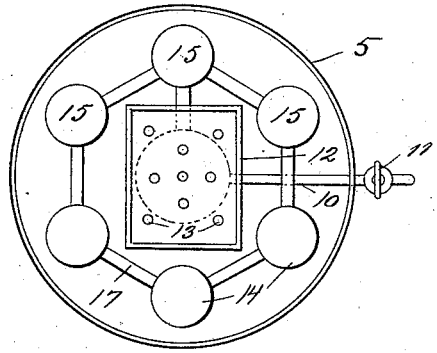
Figure 3:
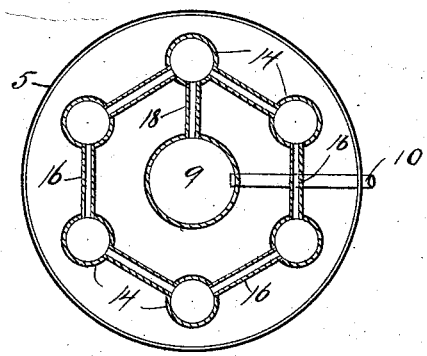

Figure 1 is a central vertical section of my improved water-cooler; Fig. 2, a plan view thereof with the top or cover removed, and Fig. 3 a section on the line 3 3 of Fig. 1.

In the practice of my invention I provide a suitable receptacle or vessel 5, which is preferably cylindrical in form and provided with a closed bottom 6, having an annular downwardly-directed flange or rim 7, and the vessel or receptacle 5 is provided with a removable cover 8.

Placed within the vessel or receptacle 5 and centrally of the bottom thereof is a circular casing 9, which is closed at its top and bottom and which is provided at one side and at the bottom thereof with a pipe 10, which projects through the side of the main vessel or receptacle and which is provided with a valve 11 in the usual manner, and mounted upon the casing 9 is a vertical and removable casing 12, which is open at the top and the bottom of which is perforated, as shown at 13.

Arranged around the vertical and removable casing 12 are a plurality of vessels 14, which are provided with removable covers 15, and said tubular vessels 14 are placed in communication at or near the bottoms thereof by means of a tube or tubes 16.

The vessels 14 are also placed in communication near their tops by a pipe or pipes 17, but this feature of the construction is immaterial or not essential to the operation of the device, and one of the vessels 14 is also placed in communication at the bottom thereof with the casing 9 by means of a pipe 18.

The form of the casing 9, which constitutes a central water vessel or receptacle, may be either angular or circular, and the central vertical and removable casing or receptacle 12 may also be made of any desired form in cross-section, and this is also true of the vertical vessels 14.

In practice the central vertical casing or receptacle 12 is filled with ice and the vessels 14 with water, and the water flows from one of said vessels into the casing or receptacle 9 and may be drawn out through the pipe 10 whenever desired. The water from the melting ice flows down over and around the central chamber or receptacle 9, and thus the water therein is kept constantly cool, and this water is, as will be understood, not brought in contact with the ice, and whenever it is desired or necessary the water in the casing or receptacle 5 may be drawn off at 19 or at any desired point.

It will be understood that the central casing or receptacle 12 may be removed whenever desired in order that the same may be cleaned and filled with ice, and each of the vessels 14 may be put in direct communication with the central chamber or receptacle 9, if desired.

It is evident that changes in the form, construction, and arrangement of the various parts of my improved water-cooler may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. A water-cooler comprising a main casing or receptacle having a removable cover, a central casing or receptacle in the bottom thereof, which is provided with a pipe which projects through the side of the main casing or receptacle, a plurality of water vessels arranged around said central chamber or receptacle, and which are placed in communication at the bottoms thereof, and also in communication with said central chamber or receptacle, and a central removable casing or receptacle, which is open at its top, and perforated at its bottom, and adapted to rest upon said central chamber or receptacle, substantially as shown and described.

2. A water-cooler comprising a main casing or receptacle, having a removable cover, a central casing or receptacle in the bottom thereof, which is provided with a pipe which projects through the side of the main casing or receptacle, a plurality of water vessels arranged around said central chamber or receptacle, and which are placed in communication with said central chamber or receptacle, and a central removable casing or receptacle, which is open at its top, and perforated at its bottom, and adapted to rest upon said central chamber or receptacle, said water vessels being tubular in form, and being provided with removable covers, and said water vessels being also placed in communication at or near their tops, substantially as shown and described.

In testimony that I claim the foregoing as my invention I have signed my name, in presence of the subscribing witnesses, this 8th day of June, 1896.

JOSEPH MELTSNER.

Witnesses:
CHARLES S. ROGERS,
M. A. KNOWLES.